E. LUNKENHEIMER.

Assignor to F. LUNKENHEIMER.

OIL CUP.

No. 10,819. Reissued Mar. 15, 1887.

Attest.
S. S. Carpenter.
J. Ammerman.

Inventor.
Edmund Lunkenheimer.
by James H. Layman.
Atty.

N. PETERS, Photo-Lithographer, Washington, D. C.

UNITED STATES PATENT OFFICE.

EDMUND LUNKENHEIMER, OF CINCINNATI, OHIO, ASSIGNOR TO FREDERICK LUNKENHEIMER, OF SAME PLACE.

OIL-CUP.

SPECIFICATION forming part of Reissued Letters Patent No. 10,819, dated March 15, 1887.

Original No. 317,464, dated May 5, 1885. Application for reissue filed September 14, 1886. Serial No. 213,530.

*To all whom it may concern:*

Be it known that I, EDMUND LUNKENHEIMER, of Cincinnati, in the county of Hamilton and State of Ohio, have invented certain new and useful Improvements in Oil-Cups; and I do hereby declare the following is a full, clear, and exact description of the invention, that will enable others skilled in the art to which it appertains to make and use the same, reference being had to the accompanying drawings.

The object of this invention is to improve the peculiar form of oil-cup seen in Letters Patent No. 299,929, issued to me June 3, 1884, which patent shows a scutcheon that rests upon the upper head or cap of the reservoir, and is capable of having its free end swung aside for the purpose of obtaining convenient access to a filling hole or orifice of said cap. This scutcheon, however, has a nutted portion that engages with a thread cut on the central tube of the reservoir or oil-cup, and, as a natural result, the turning of said scutcheon in one direction tightens it upon said tube; but when the scutcheon is swung in an opposite direction, it works loose around the tube, which alternate binding and slackening action of said device is very objectionable with some classes of oil-cups. Therefore, to render the swinging scutcheon applicable to all kinds of lubricators, I have adopted a new arrangement of devices. In the present case a swinging scutcheon is used; but the method of coupling it to the central tube is such as to prevent said scutcheon having any effect on the nut that is engaged with the upper end of said tube and clamps the cap to the oil-cup. Consequently said nut cannot become either too tight or too loose, but will always remain where set, as hereinafter more fully described.

Figure 1:
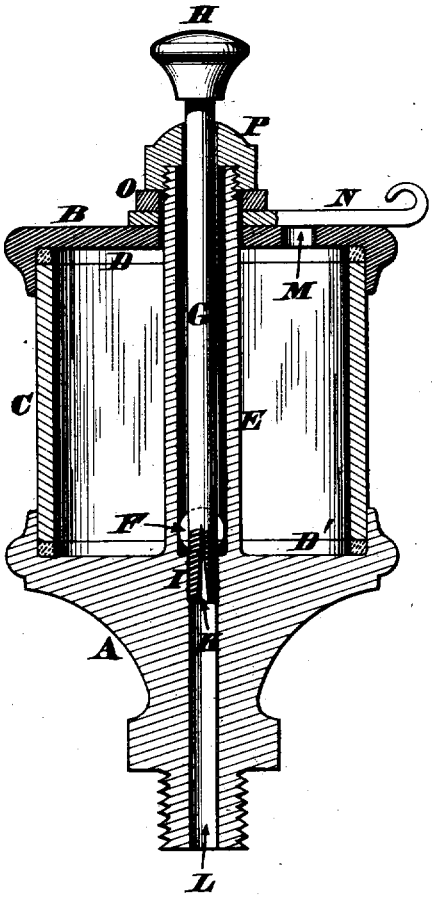
Figure 2:
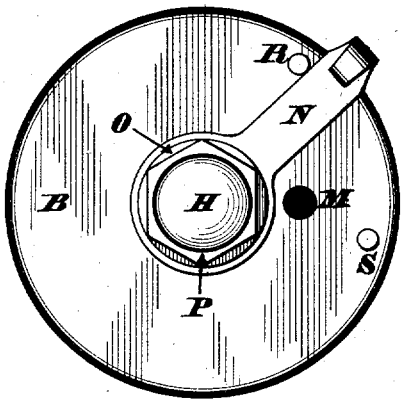
Figure 3:
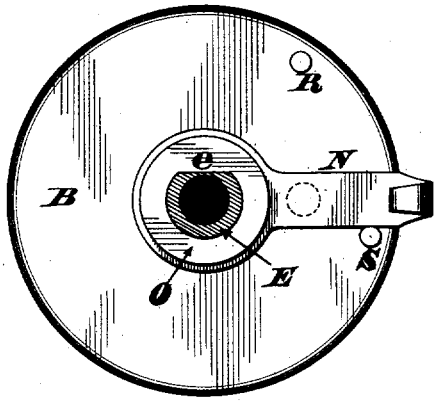
Figure 4:
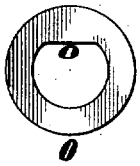

In the annexed drawings, Figure 1 is an axial section of my improved oil-cup, the filling-hole of the same being closed by the scutcheon. Fig. 2 is a plan of the cup, the scutcheon being swung aside to afford access to said hole. Fig. 3 is another plan of the cup, the scutcheon being in the same position as in Fig. 1, the valve-stem and clamping-nut being removed and the flat portion of the central tube being sectioned. Fig. 4 is a plan of the D-shaped washer interposed between the scutcheon and clamping-nut.

A represents the base, B the upper head or cap, C the glass cylinder, and D D′ the ordinary gaskets or packings at the opposite ends of said cylinder.

Projecting rigidly from the base A is a tube, E, that occupies an axial or central position within the cylinder C, said tube being provided near its lower end with a port, F, that permits the escape of oil from said cylinder, the discharge of lubricant being controlled by a valve stem, G. This stem is located within the tube E, and has at its outer end a knob or handle, H, while its inner end is screw-threaded at I. Furthermore, this inner end of said stem has a groove, K, that permits the oil to escape into the discharge-channel L of the base.

The upper head or cap, B, has a filling-hole, M, which is normally closed by a swinging scutcheon, N, the latter having an eye at one end. This eye fits over the protruding end of tube E, in order that the latter my serve as a pivot for scutcheon N. Resting upon this pivoted end of the scutcheon is a D-shaped washer, O, having a flat or segmental portion, *o*, adapted to bear against a flat portion, *e*, of the tube E, as seen in Fig. 3.

P is a clamping-nut screwed to this tube, and serving to hold the various parts of the cup securely together.

R and S are stop-pins projecting upwardly from the cap B to limit the swing of scutcheon N.

When my oil-cup is fitted together, the perforated end of scutcheon N is slipped over the protruding portion of tube E, and the D-shaped washer O *o* is then applied to said tube so as to rest upon said scutcheon. In applying this washer the flat side *o* of the same is brought to bear against the flattened portion *e* of the tube, for the purpose of locking said washer in such a manner as to prevent it being turned either to the right or left. Nut P is now engaged with the threaded end of tube E, and is screwed down upon the same until the scutcheon N is pressed quite firmly against the cap B, and as the latter is thus forced against the packing-ring D it is evident said nut serves to clamp all the various parts of said cup securely together.

To charge the cylinder C with oil or other lubricant, the scutcheon N is swung aside until it striks the stop-pin R, which operation affords the most convenient access to the filling-hole M, as seen in Fig. 2; but as soon as the cylinder is filled the scutcheon is swung back until it comes in contact with the other stop-pin, S, and thus completely covers said filling-hole, as seen in Fig. 3. Now, as considerable pressure must be exerted by the nut P, in order to keep the oil-cup together and prevent it being shaken apart by the vibrations of the machine or engine to which it is applied, and as this pressure creates some degree of friction when the scutcheon is operated, it is evident suitable provision must be made to prevent said nut being influenced by said scutcheon. This difficulty is guarded against by the non-rotatable washer O *o*, which, being incapable of turning around the tube E *e*, prevents the swinging motion of the scutcheon N being transferred to the clamp-nut P. Consequently said scutcheon can be swung both to the right and left for an indefinite length of time without in the least affecting said nut or causing it to become either too tight or too loose. It will thus be seen that after the nut has once been set to any specific adjustment it will remain in position until it is intentionally readjusted. It will also be seen that the close contact of the scutcheon with the cap causes the former, when swung around against the stop R, to brush off any dust or cinders that may have accumulated on said cap, and thereby prevent such obstructions falling down through the filling-hole M and interfering with the internal port and passage of the cup.

I claim as my invention—

1. In combination with an oil-cup having a filling-hole, a swinging scutcheon adapted to cover and uncover the latter, a nut for holding said scutcheon on its pivot, and a device interposed between said scutcheon and nut to prevent the latter being turned by the swinging of said scutcheon, substantially as described.

2. In combination with an oil-cup whose upper head has a filling-hole and is united to the reservoir by a tube traversing the latter, a swinging scutcheon adapted to cover and uncover said hole, a nut for holding said scutcheon on said tube, and a device interposed between said scutcheon and nut to prevent the latter being turned by the swinging of said scutcheon, substantially as described.

3. In combination with an oil-cup having a filling-hole, a swinging scutcheon adapted to cover and uncover the latter, a nut for holding said scutcheon on the tube uniting the two heads of the reservoir, a device interposed between said scutcheon and nut to prevent the latter being turned by the swinging of said scutcheon, and a stop to arrest said scutcheon in its closed position, substantially as described.

4. The combination, with an oil-cup having a cover, B, provided with an orifice, M, of the tubular stem E, projecting through the cover and provided with a flattened side, *e*, the arm N, journaled at one end on the stem, the washer O, bearing on the upper side of the arm, the flattened portion *o*, fitting the flattened side of the stem, and the screw-nut P, bearing on the washer, whereby the swinging movements of the arm to cover and uncover the orifice M are prevented from being transmitted to the nut, substantially as described.

5. The combination, in an oil-cup, of a central stem projecting through the upper head of the reservoir, and a swinging scutcheon pivoted to said stem, the free end of said scutcheon having an imperforate portion that is adapted to cover and uncover the filling-hole of said head, substantially as described.

6. The combination, with the central stem of an oil-cup, of a scutcheon pivoted upon said stem and having its imperforate vibrating end resting upon the upper head of the reservoir, which is provided with a filling-hole, and a nut for regulating the pressure of said scutcheon on the head of the reservoir, whereby said scutcheon can be vibrated to cover and uncover the filling-hole, substantially as described.

In testimony whereof I affix my signature in presence of two witnesses.

EDMUND LUNKENHEIMER.

Witnesses:

JAMES H. LAYMAN,

SAML. S. CARPENTER.